(12) United States Patent
Bennett

(10) Patent No.: US 8,132,412 B2
(45) Date of Patent: Mar. 13, 2012

(54) RANKLINE-BRAYTON ENGINE POWERED SOLAR THERMAL AIRCRAFT

(75) Inventor: Charles L. Bennett, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 90 days.

(21) Appl. No.: 12/512,727

(22) Filed: Jul. 30, 2009

(65) Prior Publication Data

US 2010/0162702 A1 Jul. 1, 2010

Related U.S. Application Data

(60) Division of application No. 11/731,253, filed on Mar. 29, 2007, now Pat. No. 7,637,457, which is a continuation-in-part of application No. 10/835,665, filed on Apr. 30, 2004, now Pat. No. 7,270,295.

(51) Int. Cl.
*F01K 25/02* (2006.01)
(52) U.S. Cl. ............... 60/650; 60/651; 60/682
(58) Field of Classification Search ............ 60/650, 60/651, 671, 682–683
See application file for complete search history.

(56) References Cited

U.S. PATENT DOCUMENTS

| | | | |
|---|---|---|---|
| 3,376,706 A | | 4/1968 | Angelino |
| 3,708,979 A | * | 1/1973 | Bush et al. ........... 60/522 |
| 3,978,661 A | * | 9/1976 | Cheng ............ 60/39.55 |
| 6,470,683 B1 | * | 10/2002 | Childs et al. ........... 60/641.8 |
| 6,622,470 B2 | * | 9/2003 | Viteri et al. ............ 60/39.52 |
| 7,124,585 B2 | * | 10/2006 | Kim et al. ............. 60/643 |
| 7,637,457 B2 | * | 12/2009 | Bennett ............ 244/59 |
| 2005/0242232 A1 | | 11/2005 | Bennett | |

OTHER PUBLICATIONS

G. Angelino: "Perspectives for the Liquid Phase Compression Gas Turbine". Journal of Engineering for Power, Apr. 1967, pp. 229-237, XP008097680.

\* cited by examiner

*Primary Examiner* — Hoang Nguyen

(57) ABSTRACT

A solar thermal powered aircraft powered by heat energy from the sun. A Rankine-Brayton hybrid cycle heat engine is carried by the aircraft body for producing power for a propulsion mechanism, such as a propeller or other mechanism for enabling sustained free flight. The Rankine-Brayton engine has a thermal battery, preferably containing a lithium-hydride and lithium mixture, operably connected to it so that heat is supplied from the thermal battery to a working fluid. A solar concentrator, such as reflective parabolic trough, is movably connected to an optically transparent section of the aircraft body for receiving and concentrating solar energy from within the aircraft. Concentrated solar energy is collected by a heat collection and transport conduit, and heat transported to the thermal battery. A solar tracker includes a heliostat for determining optimal alignment with the sun, and a drive motor actuating the solar concentrator into optimal alignment with the sun based on a determination by the heliostat.

5 Claims, 10 Drawing Sheets

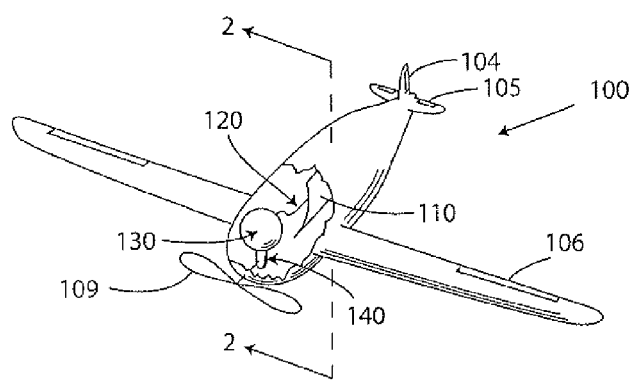
Fig. 1
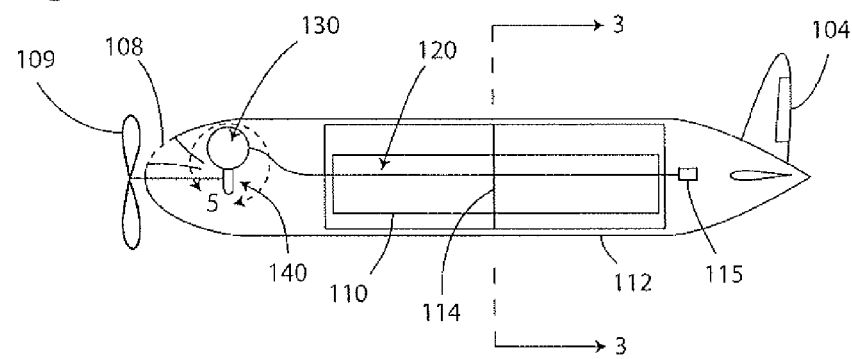
Fig. 2
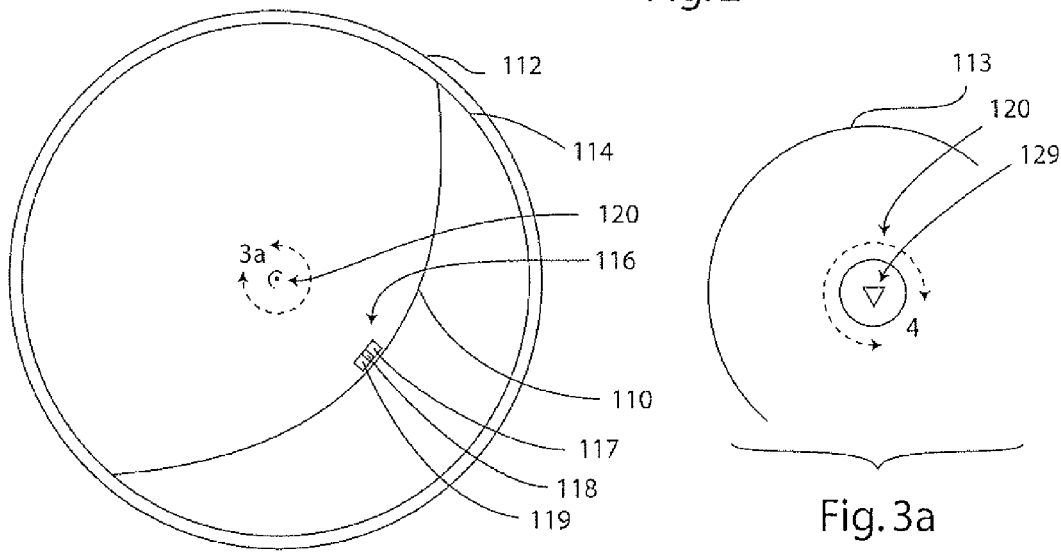
Fig. 3
Fig. 3a

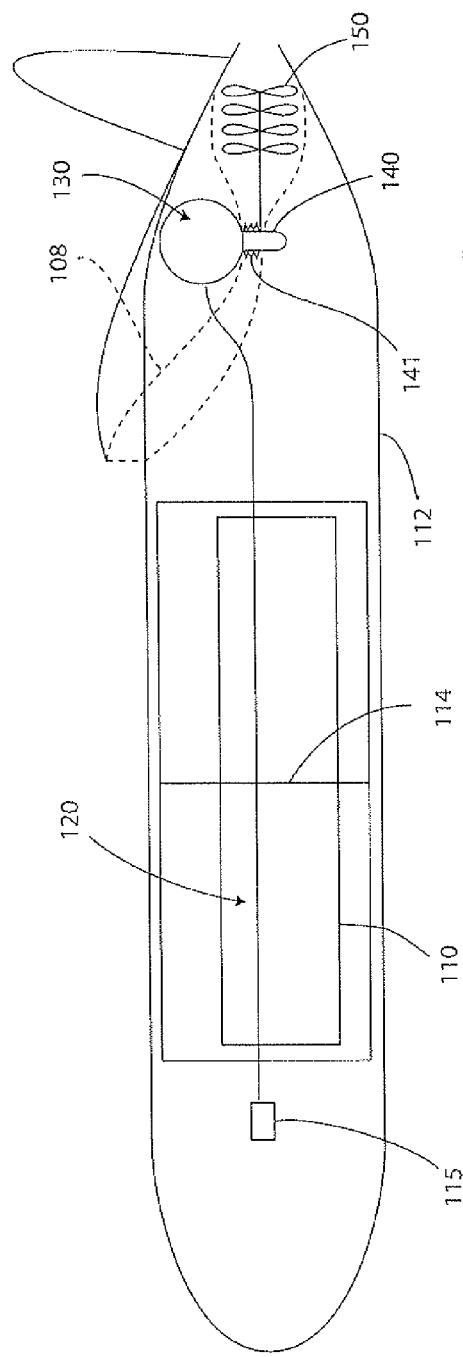
Fig. 18
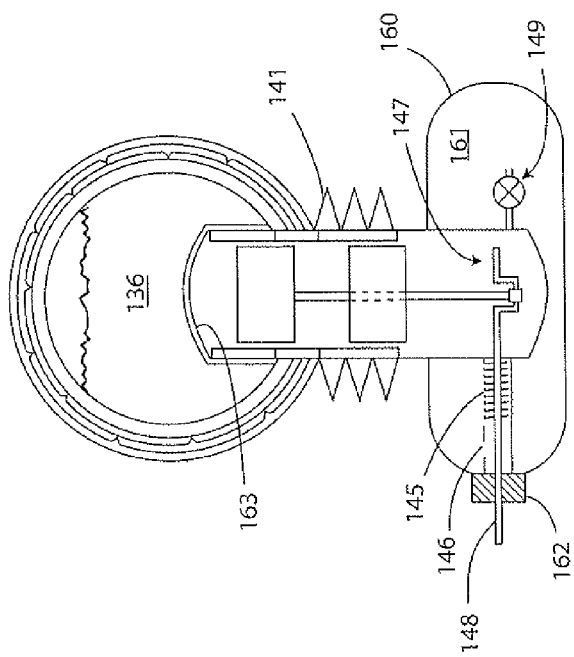
Fig. 19
Fig. 20

RANKLINE-BRAYTON ENGINE POWERED SOLAR THERMAL AIRCRAFT

I. REFERENCE TO PRIOR APPLICATIONS

This application is a divisional of application Ser. No. 11/731,253 filed Mar. 29, 2007, now U.S. Pat. No. 7,637,457 which is a continuation-in-part of application Ser. No. 10/835,665 filed Apr. 30, 2004 now U.S. Pat. No. 7,270,295, entitled "Solar Thermal Aircraft," by Charles L. Bennett, and incorporated by reference herein. Any disclaimer that may have occurred during the prosecution of the above-referenced application Ser. No. 10/817,107 is hereby expressly rescinded.

The United States Government has rights in this invention pursuant to Contract No. W-7405-ENG-48 between the United States Department of Energy and the University of California for the operation of Lawrence Livermore National Laboratory.

II. BACKGROUND OF THE INVENTION

A. Technical Field

This invention relates to high efficiency power plants, and in particular to a light-weight and efficient solar thermal power plant based on a Rankine-Brayton hybrid thermodynamic cycle, for powering a solar-thermal aircraft.

B. Description of the Related Art

Working prototypes have demonstrated the feasibility and utility of solar powered aircraft. Many if not most solar powered aircraft, however, rely on the photovoltaic conversion of sunlight to electricity to power an electric motor-based propulsion system. Batteries (or electrolyzer, gas storage, and regenerative fuel cells) are carried onboard the aircraft to store electrical energy and keep the aircraft aloft during the night, so that flight time is not limited by fuel supply as it is on a conventional aircraft. It is widely recognized, however, that onboard voltaic batteries or electrolyzer, gas storage, and regenerative fuel cell systems impose a substantial weight burden for all aircraft, and especially for high-altitude, long range aircraft.

Another problem associated with photovoltaic power generation arrangements for aircraft, especially high-altitude, long-range aircraft, is the need to orient/point the photovoltaic solar cells to face the sun. Having wing-mounted arrays of solar panels can limit the efficiency of the collection of solar power, especially at dawn and dusk, as sunlight seldom strikes the solar panels "face on". Thus in order to achieve a direct angle of impingement, the aircraft could be "banked" (i.e. laterally incline the aircraft, such as by elevating one wing or side higher or lower in relation to the opposite wing or side) in order to face the sun. This practice is disclosed by U.S. Pat. No. 4,415,133 to Phillips, as well as U.S. Pat. No. 5,518,205 to Wurst, et al. Conventional aircraft, however, cannot maintain straight flight at a large bank angle for extended lengths of time. Moreover, a related problem is the significant restriction on the latitude range over which aircraft may be flown, often seen with wing mounted solar energy collection means, i.e. photovoltaic solar cells, characteristic of the prior art. During winter, at higher northern latitudes, the maximum angle of the sun above the horizon may be relatively small, and thus the effective collection area of the wing surface may be severely restricted.

While the Phillips reference alternatively suggests that solar cells may be placed on a tilting panel within a transparent fuselage structure, this arrangement would require the inclusion of a cooling system for the inner located cells, with the associated weight and aerodynamic drag penalties. The cooling requirement discussed in Phillips for maintaining high efficiency of inside-mounted cells is a generic limitation common to all photo-voltaic solar cell powered aircraft. This same limitation precludes the practical use of solar cells at the focus of a high concentration factor solar collector, since excessive heating of solar cells leads to substantially reduced efficiency.

Furthermore, the efficiency of photovoltaic electric energy collection, storage, and utilization in the prior art is relatively limited. Photovoltaic arrays of high efficiency are very expensive and tend to lose efficiency at elevated temperatures, and thus are not practical to use at the focus of a high flux solar concentrator. The prior art system of photovoltaic electric energy collection, storage, and utilization has a relatively small power to mass ratio. Thus the aircraft must typically fly at an altitude high enough to be above the clouds, and to avoid winds with velocities much higher than the airspeed of the vehicle, as described in the Phillips reference. Because of its long endurance and limited weight-carrying ability, this type of vehicle is normally considered to be a pilotless aircraft.

Various ground based solar energy collectors and concentrators, and interfaces to heat storage media and heat engines are also known. A few examples include: U.S. Pat. No. 4,586,334 to Nilsson, and U.S. Pat. No. 6,487,859 to Mehos. The Nilsson patent discloses "... a solar energy power generation system which includes means for collecting and concentrating solar energy; heat storage means; Stirling engine means for producing power", and "... the means for collecting and concentrating solar energy is a reflective dish; and the heat transfer means includes first and second heat pipes; the heat storage means is preferably a phase change medium ..." The Mehos patent discloses: "... sodium heat pipe receivers for dish/Stirling systems", and cites references demonstrating: "... sodium vapor temperatures up to 790° C." Additionally, U.S. Pat. No. 4,125,122 discloses a heat pipe receiving energy from a solar concentrator, U.S. Pat. No. 6,700,054B2 describes connecting to a Stirling engine, among other things, and U.S. Pat. No. 4,088,120 describes a parabolic trough with a heat pipe at the focus connected to a heat storage medium. None of these representative references, however, disclose how the solar energy generation and storage system can be made sufficiently lightweight that it would be able to provide for the overnight propulsion of a solar-powered aircraft.

In addition, the utility of LiH as a thermal energy storage medium, i.e. a "thermal battery," is known, and is based on the very high thermal energy per unit mass characteristic of LiH. For example, the specific energy released in the cooling of one kg of LiH from 1200 K to 600 K is 1900 W-hr. In contrast, lithium ion electrical storage batteries contain less than 10% as much energy per kg. Even a Hydrogen-Oxygen recyclable fuel cell with associated electrolyzer and gas storage contains no more than approximately 1000 W-hr per kg. It is appreciated that no other known solid, liquid, (or gaseous, if the mass of the requisite container is accounted for) compound has as high a specific thermal energy content as LiH for this temperature range. One example of LiH used as a thermal energy storage medium is disclosed in U.S. Pat. No. 3,182,653 to Mavleos et al. and directed to a Lithium hydride body heating device that uses LiH as a phase change medium to store heat energy for use in providing warmth to a diver. The '653 patent, however, does not disclose how highly reactive LiH may be safely contained for long periods of time. Theoretically, pure LiH has an infinite hydrogen vapor pressure just beyond the melting point of LiH. Thus, a container of LiH constructed according to the Mavleos disclosure, for example, may explode upon reaching the melting point of LiH at about 700° C.

In addition to the problems associated with photovoltaic power generation and solar energy collection/storage for solar aircraft described above, the operational requirements on the power plant of a solar thermal aircraft to enable it to remain aloft through the day/night cycle are extraordinarily demanding. Even lighter-than-air craft, by virtue of high altitude winds, must provide substantial propulsive power merely to maintain station above a point of interest. The power to mass ratio is therefore critical for solar thermal aircraft applications, since below a certain level, the aircraft cannot function as desired. As such, high efficiency heat engines are necessary for such solar thermal flight.

Various types of heat engines and power plants are known having various levels of efficiency. For example, one known type are Stirling engines, which when used in the context of parabolic dish solar concentrators are known to have achieved a thermal efficiency of over 40% for the conversion of heat to mechanical power.

Another type of heat engine, exemplified by the steam engine, is based on the Rankine thermodynamic cycle. Large ground-based steam turbine power plants have demonstrated even greater efficiencies than Stirling engines. For example, state of the art 1,050 MW Ultra Super Critical Steam Turbines available from GE, use steam at a temperature of 600° C. and pressure of 250 bar and have a demonstrated thermal efficiency of 49%. Although this higher efficiency would be very helpful to the performance of a solar powered aircraft, the GE turbines that produce it are enormous in size, due to the fact that the volume expansion ratio of ultra supercritical steam must be at least several thousand in order to attain high efficiency. In contrast to such large steam turbine systems, smaller gas turbine power plants generating below 100 kW typically achieve a thermal efficiency of only about 20%, according to the report "Efficiency in Electricity Generation." And ground based power plants having a limited maximum temperature thermal reservoir, such as geothermal plants, have turned to the use of Organic Rankine Cycle alternatives to the conventional steam Rankine cycle. It is known that the Organic Rankine Cycle can enable reasonable thermal efficiency even at quite modest heating temperature. Such plants are typically limited in thermal efficiency to less than 20%.

And another type of heat engine is based on the Brayton thermodynamic cycle. For example, U.S. Pat. No. 3,708,979 entitled "Circuital Flow Hot Gas Engines," incorporated by reference herein, discloses an improved form of closed cycle hot gas engine that was originally designed to operate approximately on a Brayton thermodynamic cycle, and that provides separate cylinders for the expander and compressor. A schematic illustration of the engine arrangement of the '979 patent is shown in FIG. 21 having valves in the gas flow circuit which define four separate volumes (with all valves closed) of working fluid and which control the flow of working fluid through the four volumes.

U.S. Pat. No. 3,376,706 discloses a power plant based on a Rankine-Brayton hybrid cycle, which compresses a working fluid above its critical pressure, then heated above its critical temperature, then expanded as a working gas in a turbine such that after expansion it is still above its critical temperature. The gas is then used in a heat exchanger to heat further gas, and then refrigerated to liquid state and recycled.

Accordingly, it is an object of the present invention to provide an aircraft powered by the heat of the sun.

Another object of the present invention is to provide a lightweight and highly efficient solar power plant and system for powering an aircraft by the heat of the sun.

Another object of the present invention is to provide an internally mounted solar power plant and system for powering an aircraft which does not require internal cooling.

And another object of the present invention is to provide a means for efficiently powering a solar aircraft by using a high efficiency heat engine, such as a Stirling engine.

Another object of the present invention is to provide a means for storing sufficient solar energy accumulated during the day to enable flight through the nighttime without excessive mass burden.

Another object of the present invention is to provide a means for maximizing solar energy collection and concentration by optimally aligning a heat collection element to the sun without re-orienting or otherwise changing the flight characteristics of the aircraft, e.g. banking.

Another object of the present invention is to provide a means for conserving heat energy during night time operation by preventing backflow of a heat transfer working fluid of a heat pipe.

And another object of the present invention is to provide a means for efficiently powering a solar aircraft by using a high efficiency heat engine, such as a Rankine-Brayton hybrid cycle engine.

These objects are achieved by the present invention described hereinafter.

III. SUMMARY OF THE INVENTION

One aspect of the present invention includes an aircraft powered by the heat of the sun comprising: an aircraft body capable of producing lift and sustained free flight when propelled; heat engine means carried by said aircraft body for producing power; propulsion means powered by said heat engine means for propelling said aircraft; heat storage means in thermal contact with said heat engine means for supplying heat thereto; solar concentration means movably connected to said aircraft body for receiving and concentrating solar energy; solar tracking means including means for determining whether said solar concentration means is optimally aligned with the sun, and means for actuating said solar concentration means into optimal alignment with the sun based on said determination; and heat collection/transport means for collecting the concentrated solar energy and transporting heat to said heat storage means.

Another aspect of the present invention includes a solar thermal powered aircraft comprising: an aircraft fuselage having an optically-transparent section; wing means extending from said aircraft fuselage and capable of producing lift and sustained free flight when propelled; a heat engine for producing power and carried by said aircraft fuselage, said heat engine having a heat storage medium in thermal contact therewith for supplying heat thereto; at least one propulsion device(s) powered by said heat engine for propelling said aircraft; a solar concentrator movably mounted in said optically transparent section so that incident solar flux is transmitted therethrough to said solar concentrator for receiving and concentrating solar energy; a solar tracker adapted to determine whether said solar concentrator is optimally aligned with the sun, and actuate said solar concentrator into optimal alignment with the sun based on said determination, for tracking the position of the sun; and a heat collection and transporting conduit adapted to collect the concentrated solar energy and transport heat to said heat storage medium.

Another aspect of the present invention includes a solar thermal powered aircraft comprising: an aircraft fuselage; wing means extending from said aircraft fuselage and capable of producing lift and sustained free flight when propelled, said wing means having at least two optically-transparent sections; and associated with each optically-transparent section: a heat engine carried by said wing means for producing power, and having a heat storage medium in thermal contact therewith for supplying heat thereto; a propulsion device powered by the corresponding heat engine for propelling said aircraft; a solar concentrator movably mounted in the corresponding optically transparent section so that incident solar flux is transmitted therethrough to said solar concentrator for receiving and concentrating solar energy; a solar tracker adapted to determine whether the corresponding solar concentrator is optimally aligned with the sun and to actuate said solar concentrator into optimal alignment with the sun based on said determination, for tracking the position of the sun; and a heat collection and transporting conduit adapted to collect the concentrated solar energy and transport heat to the corresponding heat storage medium.

Another aspect of the present invention includes an aircraft powered by the heat of the sun comprising: an aircraft body capable of producing lift and sustained free flight when propelled; heat engine means carried by said aircraft body for producing power; propulsion means powered by said heat engine means for propelling said aircraft; solar concentration means movably connected to said aircraft body for receiving and concentrating solar energy; solar tracking means including means for determining whether said solar concentration means is optimally aligned with the sun, and means for actuating said solar concentration means into optimal alignment with the sun based on said determination; and heat collection/transport means for collecting the concentrated solar energy and transporting heat to said heat engine means.

Another aspect of the present invention includes a solar thermal power plant comprising: a heat engine for producing power; a heat storage medium in thermal contact with a hot side of said heat engine for supplying heat thereto; an actuable solar concentrator for receiving and concentrating solar energy; a solar tracker adapted to determine whether the corresponding solar concentrator is optimally aligned with the sun and to actuate said solar concentrator into optimal alignment with the sun based on said determination, for tracking the position of the sun; and a heat collection and transporting conduit adapted to collect the concentrated solar energy and transport heat to said heat storage medium.

Another aspect of the present invention includes an improved Stirling engine of a type having a crankcase with opposing hot and cold heat exchanging ends, a piston capable of reciprocating within said crankcase between the hot and cold heat exchanging ends, a crankshaft coupled to said piston and extending out from said crankcase so that reciprocation of said piston rotates said crankshaft, and a journal surrounding said crankshaft, the improvement comprising: at least one helical groove on a surface of one of said crankshaft and said journal and bounded by a surface of the other one of said crankshaft and said journal, said helical groove(s) communicating between an inner crankcase volume and the ambient atmosphere so that the relative motion between the rotating crankshaft and said journal pumps ambient atmosphere into said crankcase to self-pressurize the same.

Another aspect of the present invention includes an improved Stirling engine of a type having a crankcase with opposing hot and cold heat exchanging ends, a piston capable of reciprocating within said crankcase between the hot and cold heat exchanging ends, a crankshaft coupled to said piston and extending out from said crankcase so that reciprocation of said piston rotates said crankshaft, and a journal surrounding said crankshaft, the improvement comprising: a working fluid within an hermetically sealed crankcase; a crankcase pressure relief valve for controlling the crankcase pressure and the power output of said Stirling engine; a closed reservoir for receiving working fluid released from said crankcase pressure relief valve; and at least one helical groove on a surface of one of said crankshaft and said journal and bounded by a surface of the other one of said crankshaft and said journal, said helical groove(s) communicating between an inner crankcase volume and said closed reservoir so that the relative motion between the rotating crankshaft and said journal pumps the working fluid into said crankcase to self-pressurize the same, whereby working fluid released from the crankcase is recycled back into said crankcase.

Another aspect of the present invention includes a solar thermal battery for use with a heat engine, comprising: a thermally insulated container; a heat storage medium contained in said thermally insulated container and in thermal contact with a hot side of a heat engine for supplying heat thereto, said heat storage medium comprising a mixture of lithium hydride and lithium metal.

And another aspect of the present invention includes an aircraft powered by the heat of the sun comprising: an aircraft body; a Rankine-Brayton hybrid thermodynamic cycle heat engine carried by said aircraft body for producing power, said heat engine having a pump for pressurizing a sub-critical pressure liquid-phase working fluid to a supercritical pressure; heat storage means for storing thermal energy and using the stored thermal energy to heat the supercritical pressure liquid-phase working fluid to a supercritical temperature, supercritical pressure phase; an expander for substantially isentropically expanding the supercritical temperature, supercritical pressure working fluid to reduce the pressure of the working fluid back to a sub-critical pressure level; and an air-cooled condenser in thermal contact with the ambient environment for condensing the sub-critical pressure working fluid back to the sub-critical temperature liquid phase; propulsion means powered by said heat engine means for enabling sustained flight of said aircraft; solar concentration means movably connected to said aircraft body for receiving and concentrating solar energy; solar tracking means including means for determining whether said solar concentration means is optimally aligned with the sun, and means for actuating said solar concentration means into optimal alignment with the sun based on said determination; and heat collection/transport means for collecting the concentrated solar energy and transporting heat to said heat storage means.

And another aspect of the present invention includes a Rankine-Brayton hybrid thermodynamic cycle heat engine comprising: a pump for pressurizing a sub-critical pressure liquid-phase working fluid to a supercritical pressure; heat storage means for storing thermal energy and using the stored thermal energy to heat the supercritical pressure liquid-phase working fluid to a supercritical temperature, supercritical pressure phase; a positive displacement expander for substantially adiabatically expanding the supercritical temperature, supercritical pressure working fluid to reduce the pressure of the working fluid back to a sub-critical pressure level; and a condenser in thermal contact with the ambient environment for condensing the sub-critical pressure working fluid back to the sub-critical temperature liquid phase, whereby thermal energy from said heat storage means is converted to mechanical energy.

The present invention is generally directed to a lightweight, highly efficient solar thermal powered aircraft, as well as a lightweight, highly efficient solar thermal power plant for generating mechanical power from solar heat. The solar thermal power plant of the present invention powering the aircraft comprises a number of components/subsystems including: a solar heat engine such as a Stirling engine, a thermal battery and its associated multi-layer thermal insulation; a solar concentrator mirror and an associated solar tracker for determining optimal alignment with the sun and actuating into optimal alignment; a heat collector and its associated heat pipe collecting and transporting heat to the thermal battery. The solar concentrator mirror is positioned at an optically transparent section of the aircraft body to allow impinging solar radiation to pass through to the solar concentrator. These components together in the manner described herein, produce a comparably higher power to mass ratio than photovoltaic solar powered aircraft, which is an important parameter for the propulsion system of high altitude aircraft in particular.

The present invention is also directed to a light weight, high specific power, Rankine-Brayton engine-powered solar thermal aircraft which is capable of efficiently exploiting the low ambient temperature environments (near 220 K) of high altitude flight for cooling, while at the same time being constrained by the upper temperature limit provided by thermal energy storage in lithium-hydride+lithium for heating. Two aspects of the present invention enabling efficient high power-to-mass ratio operation are the choice of the working fluid, and the choice of the Rankine-Brayton hybrid thermodynamic cycle. It is appreciated that the critical temperature of a material is the temperature above which distinct liquid and gas phases do not exist. As the critical temperature is approached, the properties of the gas and liquid phases become the same, resulting in only one phase called the supercritical fluid. The critical pressure is defined as the vapor pressure just at the critical temperature.

The working fluid of the Rankine-Brayton hybrid cycle engine is generally of a type having a critical temperature just sufficiently far above the available cooling reservoir temperature that the working fluid in its low pressure working state can be condensed to its liquid phase prior to being pumped up to its high (and supercritical) pressure working state. Thus the critical pressure is intermediate between the maximum and minimum working pressures used in the engine, while the critical temperature is preferably about 10 to 20 degrees above the available cooling reservoir temperature. Examples appropriate for the high altitude environment desired for a solar thermal aircraft, for which the ambient air temperature is approximately 220 K, include ethene, ethane, and $CO_2$, but are not limited only to such.

And the Rankine-Brayton hybrid thermodynamic cycle-based power plant of the present invention is essentially a hybrid of the bottom half of a Rankine process in the lower temperature portion of the cycle together with the top half of a Brayton-like process in the higher temperature portion of the cycle, linked by a recuperating heat interchanger. More specifically, the working fluid is: first, condensed to liquid at sub-critical pressure and temperature; second, raised in pressure by a fluid pump to supercritical pressure, but sub-critical temperature; third, heated to supercritical pressure and temperature; fourth, lowered in pressure by an expander to super-critical temperature but sub-critical pressure; and finally, cooled to sub-critical temperature and pressure to start the cycle again. A substantial fraction of the heating of the high-pressure working fluid is provided via heat interchange from the cooling of the low-pressure working fluid after expansion. Since the working fluid is at super-critical pressure after the pump, it can be heated without danger of generating a mixture of gas and liquid phases, and so it is not necessary to incorporate a gas-liquid phase separator, as is generally required in conventional steam power plants. In addition, the power extracting expansion of the working fluid, by virtue of the supercritical to sub-critical pressure transition, produces a large pressure drop with only a modest temperature drop compared to the case of an ideal gas expansion. This small temperature drop is a significant factor in enabling high thermal efficiency. And by virtue of the choice of working fluid, the large pressure drop from supercritical to sub-critical pressure can be attained with a quite modest volume expansion ratio, and this fact enables the use of a single stage of expansion in the engine and this in turn enables a very compact and high specific power engine design. Finally, in view of the wide span of power levels envisioned for a solar powered aircraft that preferably adjusts power levels sufficiently to maintain station in the face of widely varying winds, and in view of the difficulty of achieving high efficiency with turbo-machinery over a wide span of power levels, it is preferred to implement the engine as a positive displacement device, such as the reciprocating piston engine described here as the preferred embodiment.

IV. BRIEF DESCRIPTION OF THE DRAWINGS

The accompanying drawings, which are incorporated into and form a part of the disclosure, are as follows:

FIG. 1 is a perspective view of an exemplary embodiment of the solar thermal aircraft of the present invention.

FIG. 2 is a side cross-sectional view of the solar thermal aircraft taken along the line 2-2 of FIG. 1.

FIG. 3 is a cross-sectional view of the solar thermal aircraft fuselage taken along the line 3-3 of FIG. 2.

FIG. 3a is an enlarged cross-sectional view of the heat collection element and back-reflector enclosed in circle 3a of FIG. 3.

FIG. 4 is an enlarged cross-sectional view of the heat collection element enclosed in the circle 4 of FIG. 3a.

FIG. 18 is a side cross-sectional view of a ducted fan embodiment of the solar thermal powered aircraft.

FIG. 19 is a cross sectional view through an alternative heat pipe embodiment comprising a 6 channel structure.

FIG. 20 is a cross-sectional view of an alternative heat storage vessel and heat engine including a hermetically sealed reservoir of working fluid.

Figure 21:
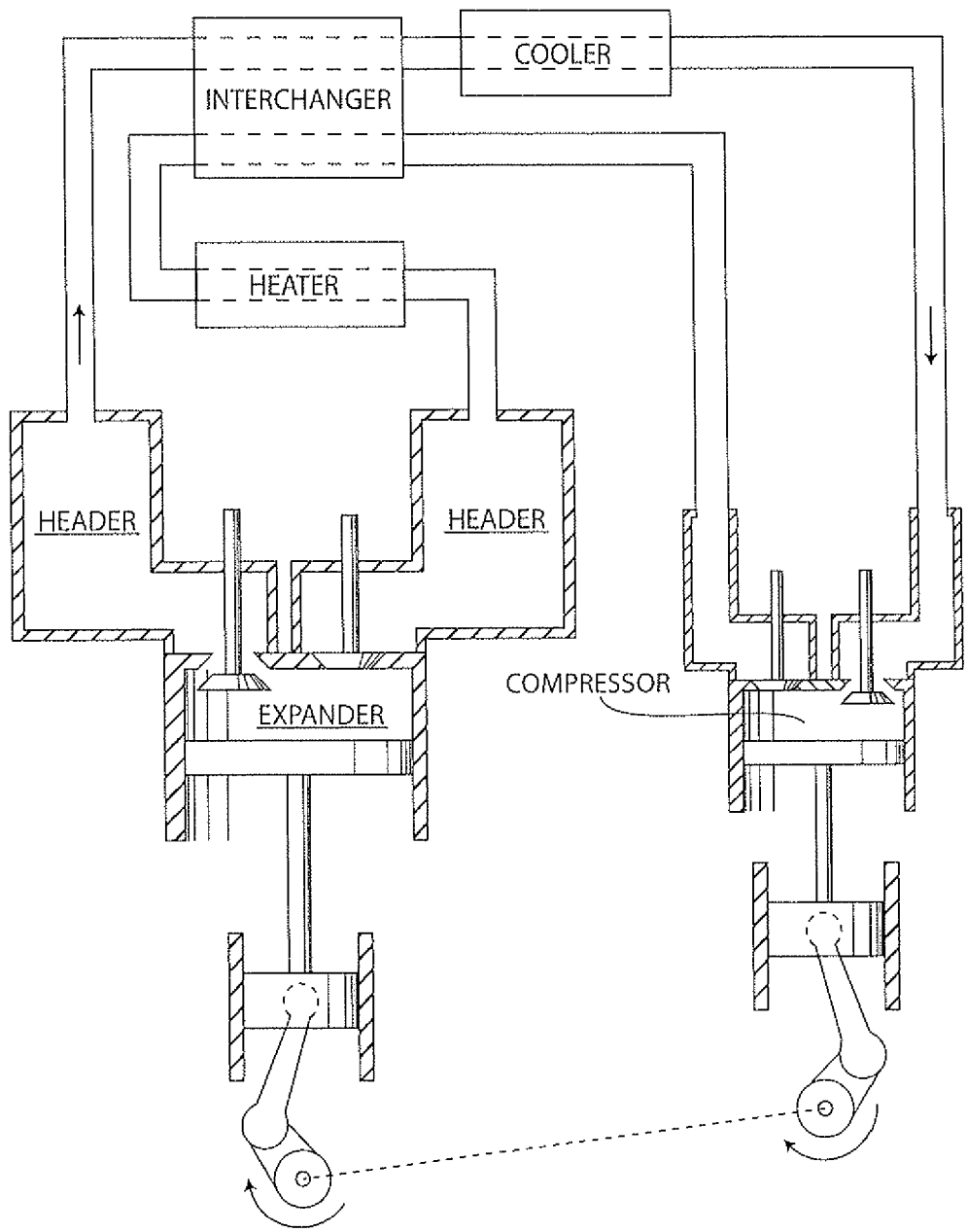

FIG. 21 is a schematic diagram representing the prior art hot gas engine arrangement of U.S. Pat. No. 3,708,979.

Figure 22:
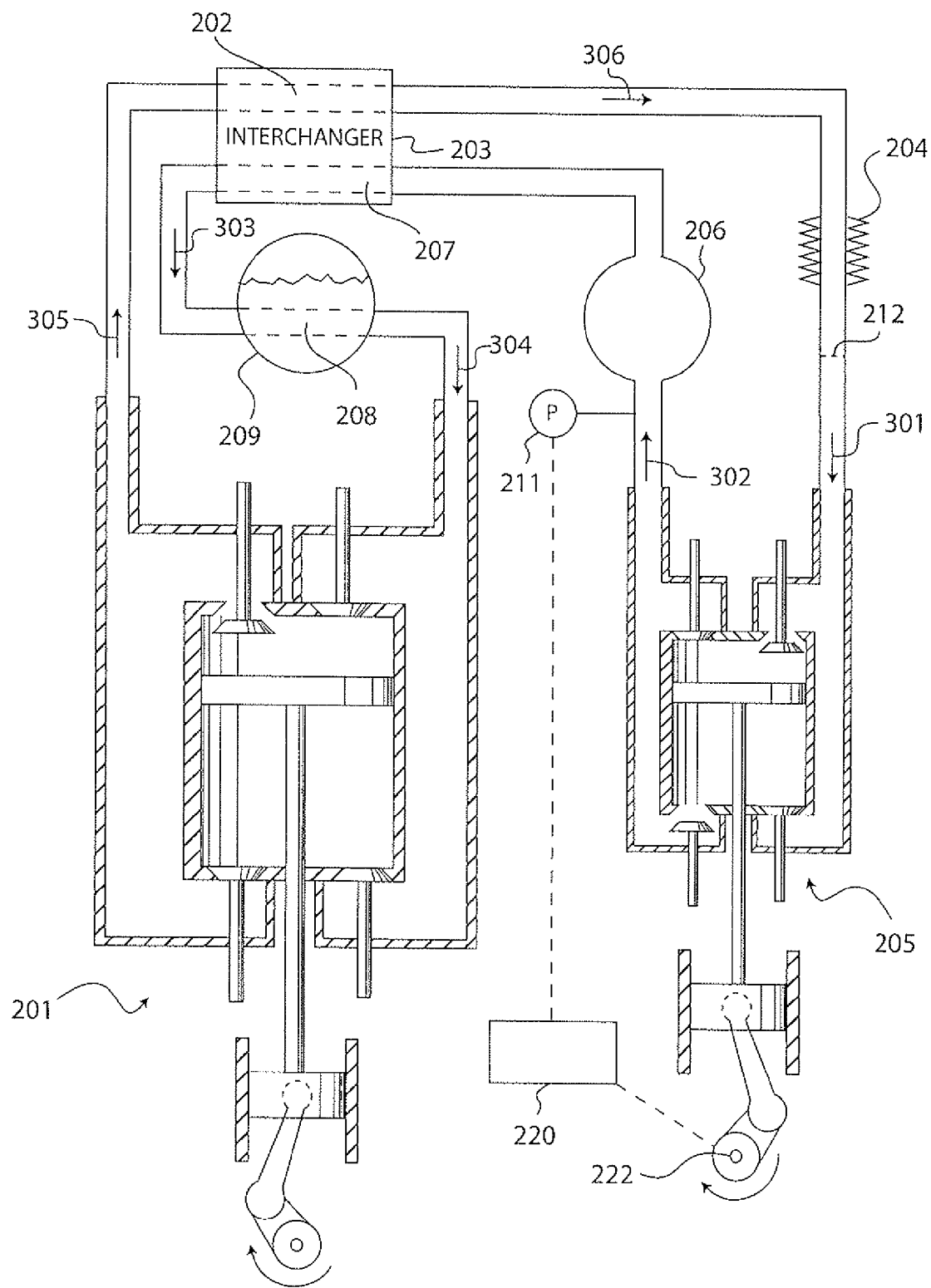

FIG. 22 is a schematic circuit diagram of an exemplary embodiment of the Rankine-Brayton combined cycle heat engine used in an exemplary embodiment of the solar thermal aircraft of the present invention.

Figure 23:
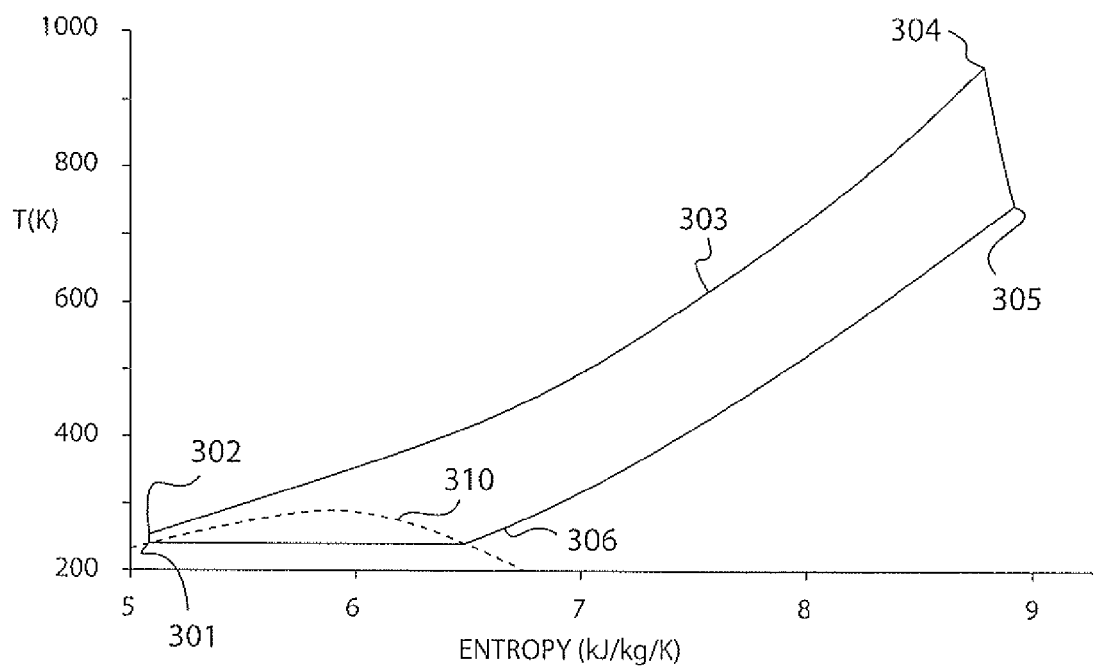

FIG. 23 is a Temperature vs. Entropy graph illustrating the Rankine-Brayton hybrid thermodynamic cycle in the specific case of ethene as working fluid.

Figure 24:
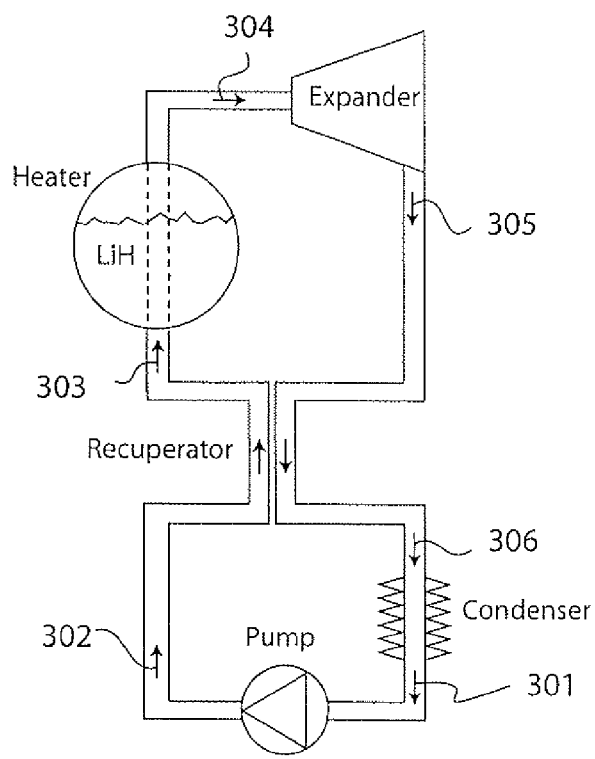

FIG. 24 is a schematic circuit diagram of a generic embodiment of the Rankine-Brayton hybrid thermodynamic cycle heat engine of the solar thermal aircraft of the present invention.

V. DETAILED DESCRIPTION

Reference numerals used in the following description are listed in Table 1.

TABLE 1

| | |
|---|---|
| 100 | Solar thermal powered aircraft |
| 102 | Wing |
| 103 | Fuselage |
| 104 | Rudder |
| 105 | Elevator |
| 106 | Aileron |
| 107 | Transmission |
| 108 | Cooling air inlet channel |
| 109 | Propeller |
| 110 | Concentrator mirror |
| 111 | Ruddervator |
| 112 | Transparent fuselage skin |
| 113 | Back-reflector |
| 114 | Solar concentrator support |
| 115 | Solar concentrator drive motor |
| 116 | Heliostat |
| 117 | Heliostat Photovoltaic A |
| 118 | Heliostat Photovoltaic B |
| 119 | Heliostat Photovoltaic C |
| 120 | Heat collector |
| 121 | Antireflection coating |
| 122 | Heat collector envelope |
| 123 | Evacuated space |
| 124 | Heat collector coating |
| 125 | Stainless steel shell |
| 126 | Vapor phase sodium |
| 127 | Liquid phase sodium |
| 128 | Sodium condenser |
| 129 | Heat pipe |
| 130 | Thermal battery |
| 131 | Highly reflective vacuum shell |
| 132 | MLI (Multi-layer insulation) layers of highly reflective material |
| 133 | LiH containment shell structure |
| 134 | Hydrogen& other dissociation products of LiH |
| 135 | Spacers between MLI layers |
| 136 | Lithium hydride and lithium |
| 137 | Lithium impervious alloy |
| 139 | Gold layer |
| 140 | Heat engine |
| 141 | Cooling fins |
| 142 | Hot side heat exchanger |
| 143 | Regenerator heat exchanger |
| 144 | Cold side heat exchanger |
| 145 | Crankshaft pump |
| 146 | Filter |
| 147 | Crank mechanism |
| 148 | Crankshaft |
| 149 | Crankcase pressure relief valve |
| 150 | Ducted fan |
| 151 | Expansion space |
| 152 | Displacer piston |
| 153 | Compression space |

TABLE 1-continued

| | |
|---|---|
| 154 | Power piston |
| 155 | Crankcase space |
| 156 | Displacer piston gap |
| 157 | Power piston gap |
| 158 | Bend region of heat pipe |
| 160 | Working fluid pressure vessel |
| 161 | Working fluid reservoir |
| 162 | Gas tight journal bearing |
| 163 | Hydrogen permeable cap |
| 164 | Operational amplifier |
| 201 | Double acting expander assembly |
| 202 | Cooling manifold w/i heat interchanger |
| 203 | Counter flow heat interchanger |
| 204 | Air cooled condenser |
| 205 | Double acting liquid pump assembly |
| 206 | High pressure, cold ethane reservoir |
| 207 | Warming manifold w/i heat interchanger |
| 208 | Heating manifold w/I LiH—Li heater |
| 209 | LiH—Li thermal energy storage vessel |
| 211 | Pressure gauge |
| 212 | Liquid level |
| 301 | Low pressure liquid phase |
| 302 | High pressure supercritical gas phase |
| 303 | Pre-heated supercritical gas |
| 304 | Maximum temperature gas phase |
| 305 | Low pressure, hot gas |
| 306 | Pre-cooled gas |

Figure 14:
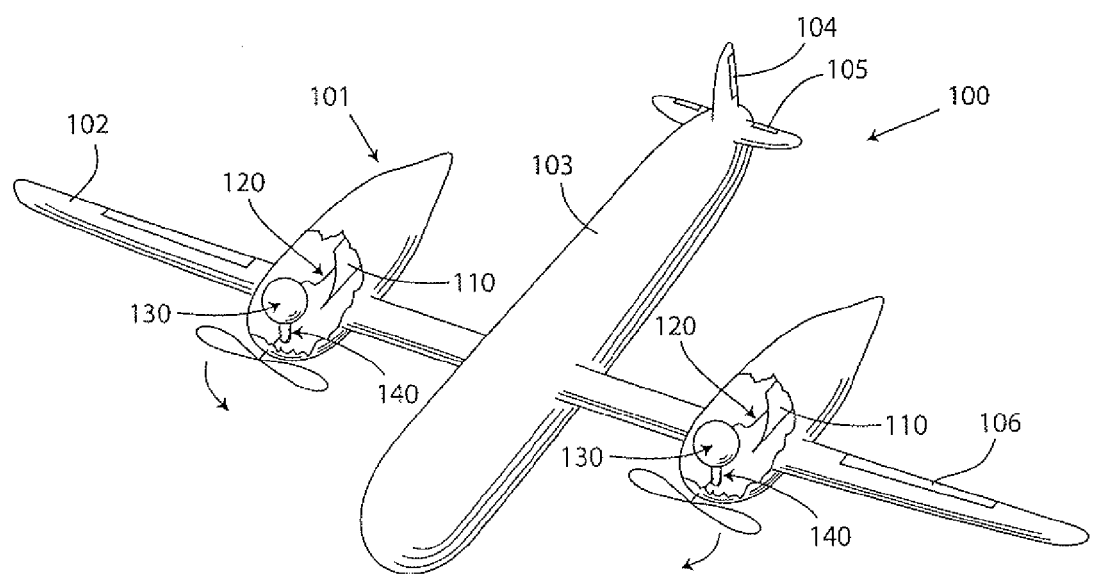
FIG. 14 is a perspective view of a twin engine/twin collector solar thermal aircraft.
Figure 15:
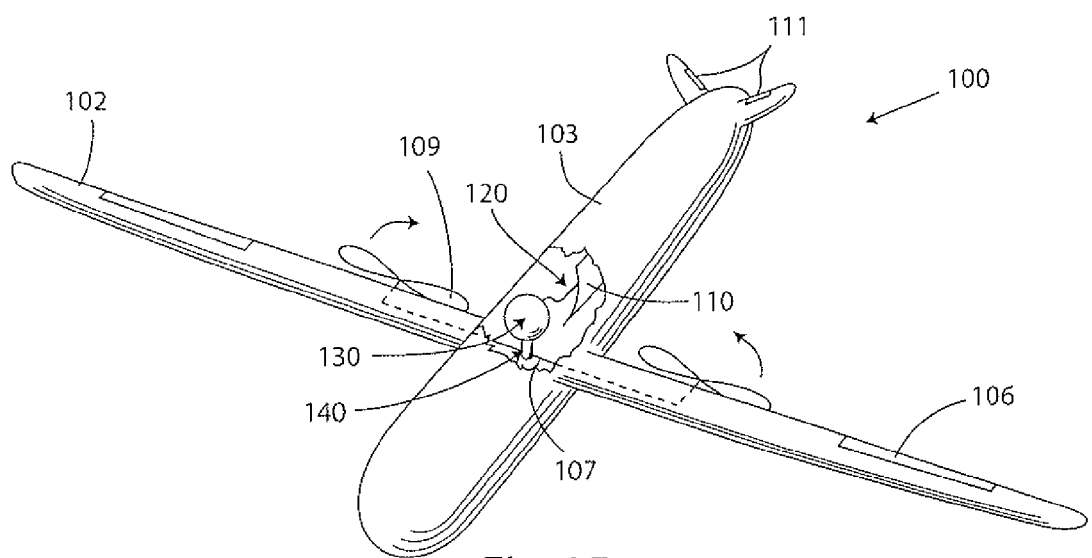
FIG. 15 is a perspective view of single engine/twin pusher propeller solar thermal aircraft.
Figure 17:
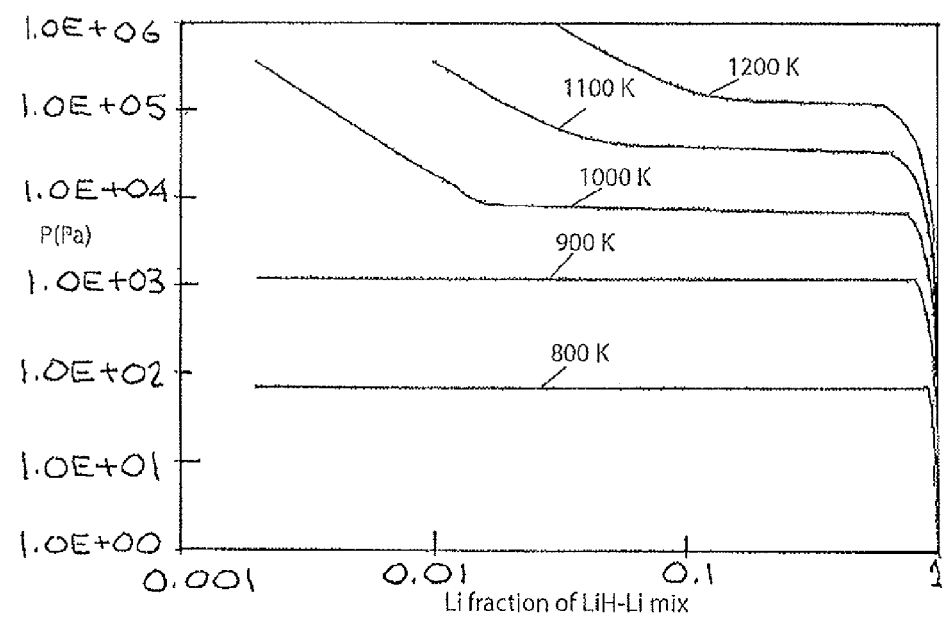
FIG. 17 is a graph of hydrogen vapor pressure in equilibrium with LiH—Li mixture.

Turning now to the drawings, FIGS. 1 and 2 show an exemplary embodiment of the aircraft of the present invention, generally indicated at reference character 100. The aircraft 100 is shown having a conventional fixed-wing airplane body configuration comprising a fuselage 103, and wings 102 and horizontal and vertical stabilizing fins extending from the fuselage. As used herein and in the claims, the term "aircraft body" generally includes the fuselage, the wings, and the horizontal and vertical stabilizing fins, among other structural components connected to and extending from the fuselage. Additionally, attitude control is provided by rudder 104, elevators 105 (or a ruddervator 111 shown in FIG. 15) and ailerons 106. And a propulsion device, such as a propeller 109 in FIG. 1, is coupled to an engine, such as heat engine 140 to propel the aircraft, and thereby produce lift and sustain free flight of the aircraft. Exemplary alternative embodiments of the aircraft body are shown in FIGS. 14, 15 and 17 discussed in greater detail below.

FIGS. 1 and 2 also show the solar thermal power plant of the aircraft 100 generally positioned in the interior of the aircraft body, namely the fuselage 103. The solar thermal power plant includes a heat engine 140, heat storage means i.e. a thermal battery 130 including a heat storage container and medium, a solar tracking concentrator 110, and a heat collection/transport conduit, device, or other means 120. The heat engine 140 is shown mounted in the fuselage 103 at a forward end, with the thermal battery 130 (and in particular the heat storage medium) in thermal contact with a hot side of the heat engine. Due to its internal location, a cooling air inlet channel 108 may be provided to direct ambient air backwash from the propeller 109 to a cold side of the heat engine for cooling. An alternative exemplary embodiment shown in FIG. 18 comprises a rear mount of a heat engine 140, with ambient air sucked past cooling fins 141 by a rearward mounted ducted fan 150. The solar tracking concentrator 110 is movably mounted for actuation in an optically transparent section 112 of the aircraft body, shown in FIG. 2 as a section of the fuselage 103. The optically transparent section 112 has a fuselage skin which is made of an optically transparent, ultraviolet resistant, lightweight material, such as TEDLAR from DuPont, that allows most of the incident solar energy to be transmitted therethrough and to the solar concentrator 110.

Solar Tracking Concentrator

FIGS. 2 and 3 show the solar concentrator, i.e. the concentrator mirror 110, in the preferred form of a parabolic trough-shaped reflector, which is movably mounted to a support structure 114 connected to the fuselage. In particular, the concentrator mirror is mounted so as to freely rotate about a rotational axis, which is preferably a focal axis of the parabolic trough reflector. Furthermore, the rotational axis may also be located to be coaxial with the central axis of the fuselage. In any case, the concentrator mirror may be made of a lightweight, thin plastic film, for example, stretched over a skeleton array of formers and coated with a thin layer of highly reflective metal, such as gold or silver. And the solar concentrator support structure 114 is preferably a space frame that allows most of the incident solar flux to be transmitted to the concentrator mirror 110. The entire solar concentrator assembly is balanced, so that no torque is required to hold a particular orientation.

Rotational control of the solar concentrator is provided by a solar tracking device or means including a device or means for determining whether the solar concentrator is optimally aligned with the sun, and a device or means for actuating, e.g. rotating, the solar concentrator mirror into optimal alignment with the sun based on the optimal alignment determination. As used herein and in the claims, "optimal alignment" is that alignment and angle producing the highest concentration of solar flux, i.e. a position "directly facing" the sun. The actuation device or means may comprise, for example, a drive motor 115 (FIG. 2) mounted on the rotational axis of the solar concentrator assembly. And the device or means utilized for determining optimal alignment may be a heliostat 116 adapted to determine the alignment of the sun with respect to the focal axis of the concentrator mirror 110 and operably connected to the drive motor 115 to control the rotational actuation of the solar concentrator. In particular, the heliostat is adapted to detect a shadow of a heat collection and transport element (heat pipe) along the focal axis for use in the optimal alignment determination. The heliostat 116 is shown in FIG. 2 mounted on the concentrator mirror, and in particular, along a symmetric plane of the reflective parabolic trough. The heliostat 116 includes sensing elements which are preferably solar cells (e.g. 117-119) and which are preferably symmetrically arranged about the symmetric plane of the concentrator mirror 110. In a preferred embodiment, the solar cells include a center cell 118, and two outer cells 117, and 119 on opposite sides of the center cell.

Figure 11:
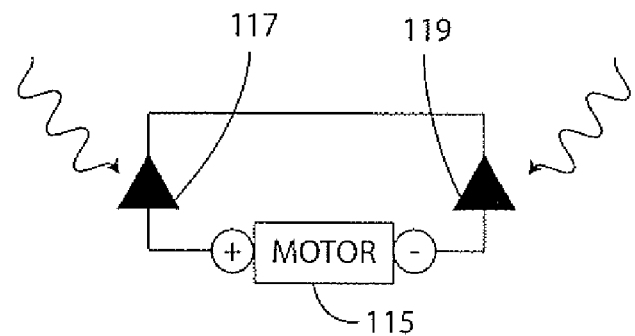
FIG. 11 is a heliostat circuit diagram for sun-tracking mode.
Figure 12:
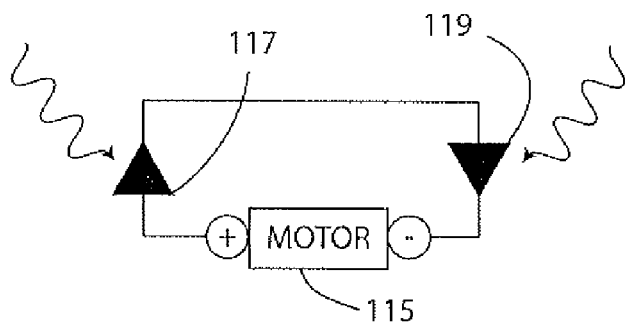
FIG. 12 is a heliostat circuit diagram for sun-searching mode.
Figure 13:
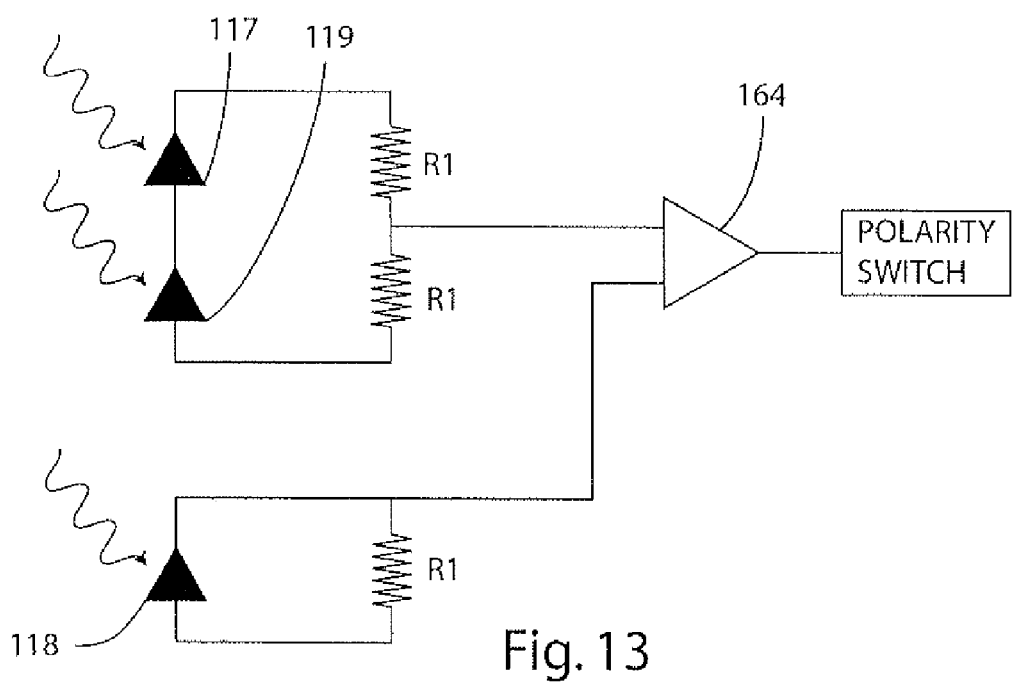
FIG. 13 is a heliostat mode switching circuit diagram.

A preferred method of heliostat operation uses the one center and two outer solar cells in a closed loop feedback stabilization system involving two modes of operation: a sun-searching mode, and a sun-tracking mode, shown in FIGS. 11-13. First, in the sun-tracking mode, the sun is already aligned with the symmetric plane of the reflective parabolic trough, and deviations from alignment are detected. When the solar concentrator is properly, i.e. optimally, aligned to the sun, both outer cells 117, 119 of the heliostat 116 are equally illuminated, while the central cell 118 is in the shadow of the back-reflector 113 of the heat collector 120 (or the shadow of the heat collector itself if a back-reflector is not used). As the alignment deviates slightly from the optimal, one of the outer solar cells 117, 119 in the heliostat 116 gets a greater solar exposure, while the opposing cell exposure decreases. These sensors feed into a control mechanism (not shown) known in the art, operably connected to the actuating mechanism, e.g. motor 115, for adjustably rotating the solar concentrator 110 on the support structure 114 to maintain optimal alignment of the concentrator mirror to the projected direction to the sun. An example of such a system is shown in FIG. 11. In this figure, the voltage sent to the DC electric motor 115 is the difference of the voltages across the photo-diodes 117 and 119, and is proportional to the deviation from the aligned position, and has a nearly linear restoring torque for a certain range of deviations.

In the sun-searching mode, photo-diodes associated with the two outer cells 117 and 119 are connected electrically as shown in FIG. 12. As long as some solar illumination is present, the DC motor 115 produces a driving torque on the solar concentrator structure. Under the condition that no shadow falls on any of the photo-diodes, and they are all equally illuminated, the average voltage of the end photo-diodes (which are driving the motor) is less than the voltage across the central diode. In this case, the output of operational amplifier 164 is low, and the polarity switch is in sun-searching mode. The transition from sun searching mode to sun tracking mode occurs as the shadow of the axial heat collector back-reflector falls onto center photo-diode 118. As the central photo-diode becomes sufficiently shaded, its voltage drops below the average voltage of the outer two photo-diodes 117 and 119. A circuit that exploits this drop in the central diode voltage to change the relative polarity of the diode 117 and 119 connections to the motor 115, is displayed in FIG. 13. As the central diode 118 becomes sufficiently shaded, its voltage drops, and the output of the operational amplifier goes high, thus triggering the sun-tracking mode. Friction of the mechanical structure serves to damp oscillations about the properly aligned orientation.

It is appreciated that sun-searching mode is required at sunrise once per day, and also each time the aircraft heading becomes very close to the projected direction to the sun, and the heliostat is not sufficiently illuminated to maintain sun-tracking. Additionally, the solar cell sensors are adapted to provide power to directly drive the axial rotation actuator, i.e. DC motor 115, and no external power source is required. In this manner, the mass and complexity required for the heliostat system are greatly reduced.

Heat Collection and Transport Element (Heat Pipe)

Figure 4:
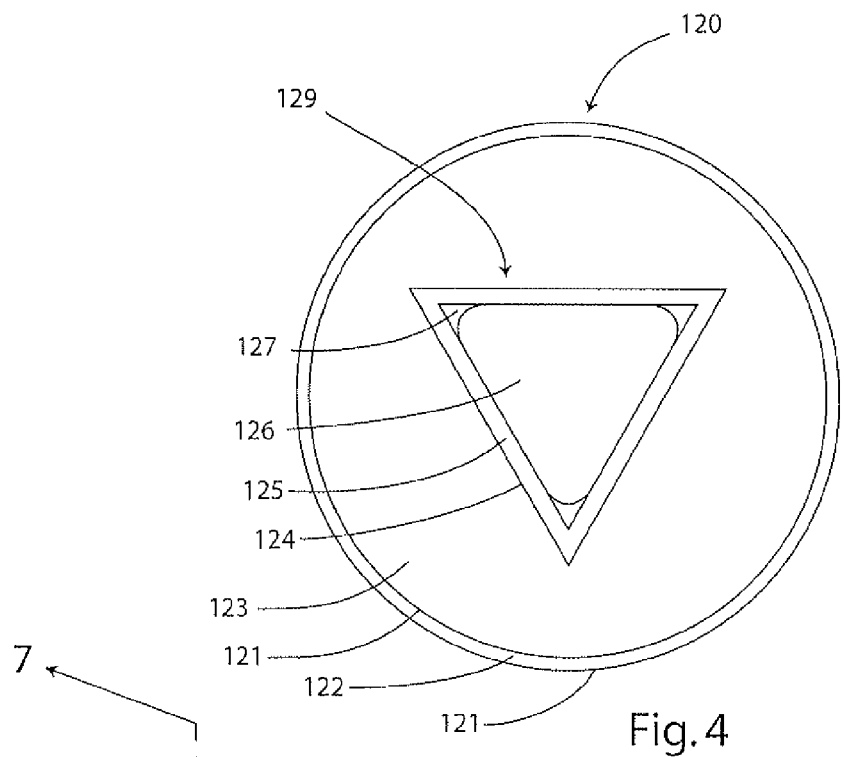

Once the parabolic trough reflector 110 is aligned to the sun, solar radiance is focused onto the center of a heat collector 120 shown best in FIGS. 2 and 3 as being located along the focal axis of the parabolic trough reflector 110 (shown also as the central axis of the fuselage 103). As shown in FIGS. 3a and 4, the heat collector 120 includes a central heat pipe 129 and a heat collector envelope 122, which is a transparent vacuum vessel that allows focused sunlight to transmit to the central heat pipe 129. In a preferred embodiment, the envelope material is fused silica, by virtue of its high transparency, high strength, and tolerance to high temperature. The transparent heat collector envelope 122 is constructed to support a sufficiently high vacuum in the evacuated space 123 to prevent significant conductive or convective heat loss from the central heat pipe 129. The heat collector envelope 122 may have an antireflection coating 121 that decreases the transmission loss of sunlight to the central heat pipe, and minimizes radiative heating of the envelope by the hot central heat pipe. As shown in FIG. 4, both an inner surface and an outer surface of the heat collector envelope 122 are coated with the antireflection coating 121.

Figure 5:
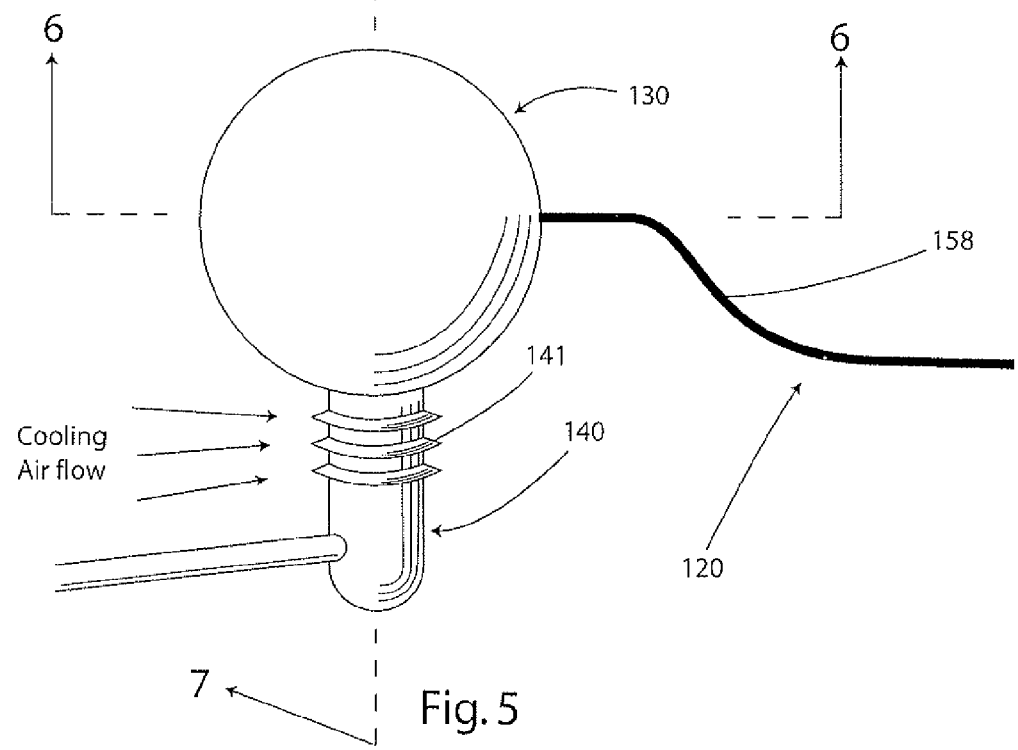
FIG. 5 is a perspective view of the heat storage vessel coupled to a heat engine.

As shown in FIG. 4, the heat pipe 129 preferably has a triangular micro-heat pipe structure 129 with a single triangular channel, which configuration is especially suited for small aircraft applications. For larger aircraft applications, however, heat pipes having a network of multiple capillary channels in parallel are preferred. An example of the multiple capillary channel configuration is shown in FIG. 19, illustrating a close packed assembly of six parallel channels each having a triangular cross-section. The heat pipe 129 contains a heat transfer working fluid that operates to collect solar energy and transport heat to the heat storage medium and/or heat engine (see FIGS. 5 and 6). The heat transfer working fluid is preferably sodium, in both liquid phase 127, shown as a meniscus along the three corners of the triangular heat pipe structure, and vapor phase 126. Alternatively lithium may be utilized as the heat transfer working fluid. In any case, the radius of curvature of the heat pipe working fluid meniscus varies across the length of the heat acceptance region of the heat collector and produces a pressure drop that drives vapor from the hot end of the heat pipe, located along the focal axis of the solar concentrator, to a sodium condenser 128 located inside the thermal battery 130. A corresponding return flow of liquid sodium drains from the condenser into the hot section. This drain is primarily driven by capillary forces, but is also supplemented by gravity in a bend region 158 of the heat pipe illustrated in FIG. 5 and discussed in greater detail below.

The shell 125 of the heat pipe shown in FIG. 4 is preferably constructed of high strength, high temperature material, such as stainless steel, with an outer coating 124 that absorbs sunlight very efficiently, while at the same time having relatively low thermal emissivity. According to the reference: "Reducing the Cost of Energy from Parabolic Trough Solar Power Plants: Preprint", by H. Price and D. Kearney, available from the National Technical Information Service, report number NREL/CP-550-33208, published in January 2003, and incorporated herein by reference, an envelope solar transmittance of 96%, a coating solar absorptance of 94.1%, and a coating thermal emittance of 9.1% have been shown to be practical for solar energy collection systems. Assuming these values for the optical properties of the collection element, the efficiency for operation of the heat pipe at 1150 K, near the boiling point of sodium would be approximately 85% for an equilateral triangle cross section heat pipe 129 having a base width equal to 0.35% of the aperture of the concentrator mirror 110.

With the addition of a highly reflective, semi-circular back-reflector 113, shown in FIG. 3a, this efficiency increases to approximately 90%. The back-reflector is positioned adjacent the heat collector 120 at a side opposite the parabolic trough and preferably rotatably mounted to the solar concentrator support structure 114 together with the solar concentrator. In the preferred embodiment, the back-reflector 113 has a semi-circular cross-section that is concentric to the heat pipe, and thus much of the thermal radiation from the heat pipe emitted in the direction away from the concentrator mirror is not lost, but is instead reflected back and refocused onto the heat pipe. Heat pipes having diameters significantly greater than 0.35% of the concentrator aperture absorb somewhat more power, but have greater radiating surface area and are thus less efficient. Heat pipes having diameters significantly less than 0.35% of the concentrator aperture are significantly smaller than the projected image of the sun on their surface, and thus have low collection efficiency. The efficiency of 90% with the back-reflector 113 represents the fraction of the solar energy incident on the concentrator mirror that is realized as heat to the hot side of the heat engine and is available for thermal storage. The solar collection coating 124 extends only over the portion of the heat pipe that is illuminated by the solar concentrator. For the interval between the end of the solar absorption region and the thermal battery, the heat pipe outer surface is high reflectively material, such as gold. This reduces the thermal emission from the heat pipe in regions where it is not designed to be collecting solar energy.

The fabrication methods for the heat collector 120 are well known to those skilled in the art of electronic vacuum tube fabrication. Indeed, the overall structure is similar to a long cylindrical "light bulb", consisting of a transparent envelope with a central high temperature "filament", i.e. the heat pipe 129. As is well known in the art, such vacuum vessels can maintain a vacuum of sufficient quality to maintain thermal insulation between the filament and the glass envelope for years. A getter, such as titanium, (not shown) may be deposited on the inside of the heat collector envelope in the section between the solar concentrator region and the thermal battery in order to help maintain the requisite vacuum quality, and yet not degrade the heat collection efficiency.

Thermal Diode Action of Heat Pipe

Since the heat transport mechanism in the heat pipe 129 is predominantly driven by capillary action when sunlit, a gentle bend in the heat collector 120 may be employed for the convenience of coupling the heat collector 120 to the thermal battery 130. Moreover, a bend such as downward sloping bend 158 in FIG. 5 between the thermal battery 130 and the solar concentrator 110, also provides a "thermal diode" action for the heat pipe. The downward slope in the bend 158 away from the thermal battery 130 serves as a "drain" for the heat pipe working fluid during dark periods. Since the heliostat device acts autonomously to maintain the solar concentrator pointed at the sun whenever sunlight is available; during sunlit hours the sodium, for example, in the heat pipe remains active as a heat transfer medium. During periods of extended darkness, sodium in remote regions of the heat pipe from the thermal battery 130 will liquefy and then solidify. Liquid sodium will drain out of the thermal battery 130 by gravity down the bend 158 in the heat pipe 120. Eventually, almost all of the sodium will be frozen in regions of the heat pipe below the bend region 158. The remaining thermal connection out of the thermal battery is the thin stainless steel heat pipe shell, and the thin glass envelope, neither of which have significant thermal conductivity. In this fashion, the heat pipe acts as a thermal diode to prevent significant loss of heat from the thermal battery during periods of extended darkness, as at night, or during extended periods of heavy cloud cover, while having very high heat transport efficiency during sunlit periods.

Thermal Battery Container

Figure 6:
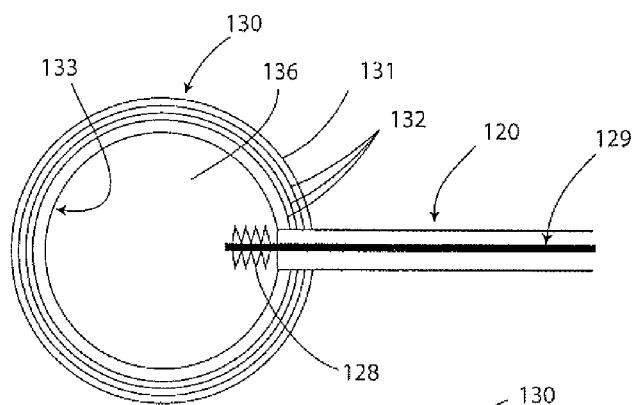
FIG. 6 is a cross-sectional view of the heat storage vessel taken along the line 6-6 of FIG. 5.
Figure 9:
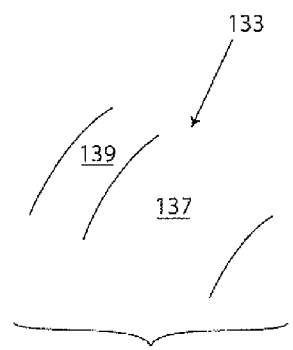
FIG. 9 is an enlarged cross-sectional view of the lithium hydride containment shell structure.
Figure 7:
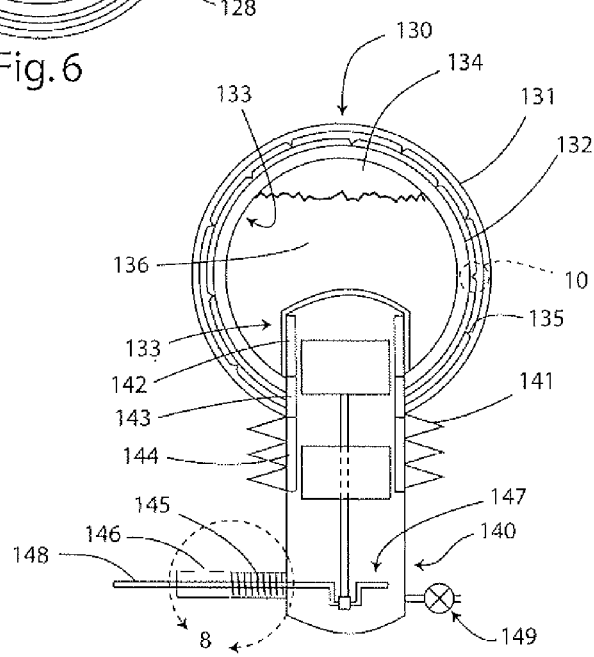
FIG. 7 is a cross-sectional view of the heat storage vessel and the heat engine taken along the line 7-7 of FIG. 5.
Figure 10:
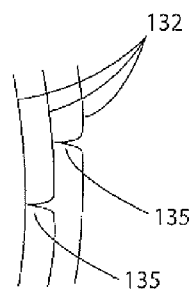
FIG. 10 is an enlarged cross-sectional view of the multi-layer insulation structure.
Figure 8:
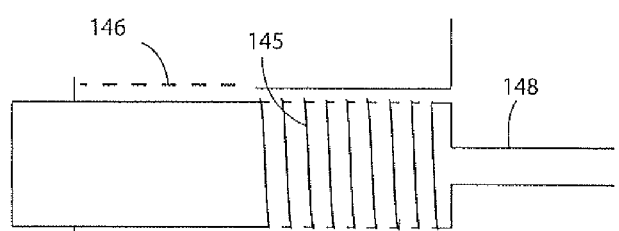
FIG. 8 is an enlarged cross-sectional view of the crankshaft pumping structure enclosed in the circle 8 of FIG. 7.

As previously mentioned and further shown in FIGS. 6 and 7, the thermal battery 130 includes (1) a heat storage container comprising layers 131, 132, 133 and (2) a heat storage medium, i.e. thermal battery core 136 contained in the heat storage container. With respect to the heat storage container, i.e. thermal battery container, it includes several layers of thin, highly reflective material 132, separated by spacers 135, and a highly reflective outer vacuum vessel 131, surround a containment shell structure 133. As shown in FIG. 9, the containment shell structure 133 is further comprised of a primary containment shell 137 and a gold layer 139, described in detail below. The layers of highly reflective material act as radiation shields, and provide thermal insulation of the hot thermal battery core 136. The spacers 135 separating the multiple layers of reflective material in the preferred embodiment are simply pointed dimples in the reflective material, having very little mass, and providing very little thermal contact between layers. The vessel 131 is evacuated to prevent conductive or convective degradation of the thermal insulation. A certain quantity of getter material, such as titanium, (not shown) may be deposited on the interior of the vacuum vessel 131 in order to maintain sufficiently high vacuum quality that the thermal insulation quality of the multi-layer insulation is preserved. As is well known to the person of ordinary skill in the art, for such a multi-layer insulation structure, designed to have negligible conductive and convective thermal loss, for a reflective material having an emissivity of 0.03 (as is typical of goal coatings) in a total of 15 layers, and an inner temperature of 1200 K, the effective thermal emissivity is 0.001, and the radiative cooling power loss rate is approximately only 120 W/m$^2$.

Thermal Battery Core

With respect to the heat storage medium, i.e. thermal battery core 136 contained by the thermal battery container, the utility of LiH as a thermal energy storage medium was previously discussed in the Background, and is due to the very high thermal energy per unit mass characteristic of LiH. However, in order to address the problem of lithium-hydride containment for high temperatures, e.g. 700° C. and above, a small admixture of lithium is utilized in order to prevent a hydrogen explosion. Thus the heat storage medium, i.e. the thermal battery core 136, consists of a mixture of lithium hydride and lithium metal, in equilibrium with various dissociation products 134, including hydrogen gas and liquid phase lithium and lithium hydride. The most significant contribution to the total vapor pressure is the partial pressure of hydrogen. The equilibrium hydrogen pressure is a function of both the temperature and the fraction of Li in a LiH—Li mixture, as is displayed in FIG. 17. Theoretically, pure LiH has an infinite hydrogen vapor pressure just above the melting point of LiH. It is therefore necessary either to provide a certain small quantity of Li along with the LiH in the thermal battery core, or to allow some hydrogen to permeate out of the container prior to final sealing. In this manner, thermal energy storage in a lithium-hydride+lithium mixture provides very high energy storage density and does enable sufficient energy storage, such as for overnight flight.

The fabrication of the LiH and Li mixture may be achieved by starting with an initially pure quantity of LiH in the thermal battery fabrication process, and after initial hermetic sealing of the LiH in its primary containment shell 137, consisting of a LiH—Li impervious alloy, test the quality of the seal by heating the LiH to just below the melting point. Some possible alloys that are relatively inert to Li are Mo—Z, Mo—Re, and Nb—Zr, as described in "High Temperature Liquid Metal Heat Pipes", by A. Bricard, T. Claret, P. Lecocq and T. Alleau, in the Proceedings of the 7$^{th}$ International Heat Pipe Conference, (1993), incorporated by reference herein. In addition, very low carbon steel is also inert to Li and LiH. According to the reference: "Compatibility of potential containment materials with molten lithium hydride at 800° C.", by S. J. Pawel, published in the Journal of Nuclear Materials vol. 207, pp. 136-152, in 1993, also incorporated herein by reference, "Stabilized (Nb and Ti) low carbon (<0.06%) steels are observed to be essentially inert in LiH at 800° C. with stable carbides and no grain growth." The initial "seal test" heating step causes a significant pressure of hydrogen to build up in the LiH container. If the seal is bad, a relatively high hydrogen pressure will be observed. In contrast, if the container is well sealed, a much lower hydrogen pressure will still be seen outside the container, due only to hydrogen permeation. After a small quantity of hydrogen has been allowed to permeate out of the container, the LiH may be slowly raised (in order to avoid an excessive pressure spike) above the melting point, and sufficient hydrogen removed by permeation to bring the Li metal fraction remaining in the core 136 up to a desirable value.

As an example, by getting to a 2% Li metal mixture, the hydrogen pressure at a working temperature of 1100 K will be just over one atmosphere, as can be read from the plot in FIG. 17. Once the desired LiH—Li mix has been reached, heating may be ended, and the LiH container allowed to cool. In order to prevent further significant hydrogen permeation, the inner LiH containment shell is coated with a gold layer 139. The outermost layer of gold 139 provides a permeation barrier to the evolution of hydrogen. A gold layer of approximately 0.001" is estimated to yield a hydrogen containment lifetime of over a year. Gold has the additional advantage of having low thermal emissivity (approximately 3%), and thus provides for low thermal radiative cooling loss through the multi-layer thermal insulation.

Inner cavities inside the thermal battery 130 provide good thermal contact to both the sodium condenser 128 at the end of the heat pipe 129, as illustrated in FIG. 6. The external surface of the sodium condenser 128 is primarily cooled by hydrogen "boiling" as the LiH dissociates. Hydrogen bubbles rise to the vapor space, with some hydrogen-lithium recombination occurring in the liquid phase 136, and some recombination occurring in the vapor phase 134, until equilibrium is reached. The sodium condenser is sufficiently large to assure that the heat flux through the sodium condenser 128 into the thermal battery is below the critical heat flux marking the onset of so-called "transition" boiling, and thus maintains a high heat transfer efficiency.

Heat Engine

Figure 16:
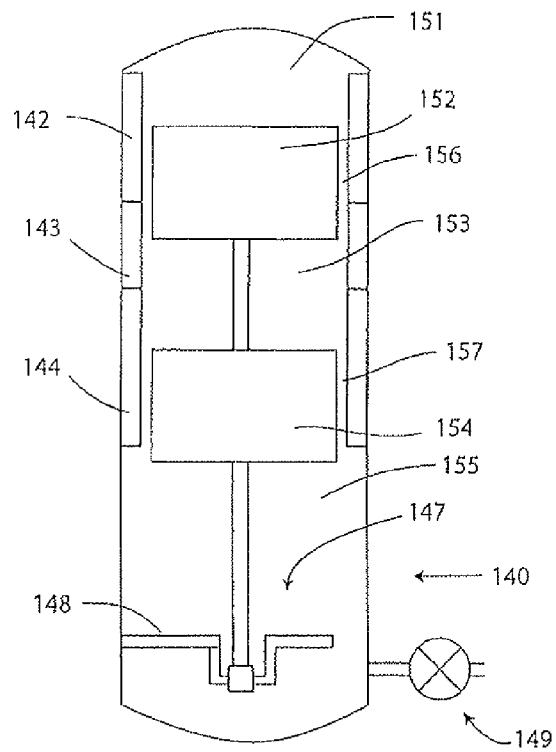
FIG. 16 is a cross-sectional view of a Stirling engine.

FIG. 16 illustrates a Stirling engine of the beta form, well known to practitioners in the art of heat engines, which serves as a preferred embodiment of the heat engine 140. Generally, a crank mechanism 147 converts the reciprocating motion of the Stirling engine to rotary motion of a propeller by a crankshaft 148, as is well known to those skilled in the art. The Stirling engine has a hot side and a cold side, represented by a hot side heat exchanger 142 and a cold side heat exchanger 144, respectively. The Stirling engine mechanism forces a working fluid, such as for example air or helium hermetically sealed therein, to cyclically pass from the expansion space 151 through the hot side heat exchanger 142, the regenerator 143, the cold side heat exchanger 144, the compression space 153, and back. The working fluid goes through a pressure cycle that is phased to deliver net power over the course of a cycle, through the power piston 154 to the crankshaft 148. The phase of the variation of the compression space volume 153 relative to the expansion space volume 151 is approximately 90°. The gap 156 around the displacer piston is sufficiently large that only an insignificant pressure drop is developed between the expansion space 151 and the compression space 153. In contrast, the gap 157 around the power piston is sufficiently small that almost no working fluid between the compression space 153 and the crankcase space 155. Still, over many cycles, sufficient working fluid does flow through the power piston gap 157 that equilibrium is reached between the average pressure in the compression space 153 and the average pressure in the crankcase space 155.

As illustrated in FIG. 7, the thermal battery 130 generally and the heat storage medium in particular, e.g. the LiH/Li mixture, is in thermal contact with the hot side of the heat engine 140 for supplying heat thereto from the stored heat transported by the heat collection and transporting conduit, i.e. heat pipe 120. The hot side heat exchanger 142 is primarily heated by conduction from the hot liquid phase 136 through the thin container wall 133. Waste heat is removed from the cold side heat exchanger 144 of the heat engine 140 by forced convective cooling provided by ambient air flowing in through the inlet channel 108 past a set of cooling fins 141. Since the air temperature at high altitude is very low, approximately 220 K between 10 km and 40 km, the cold side of the heat engine can be held relatively cool, and the resulting Carnot heat engine efficiency may exceed 70%. Achieving such efficiency is aided by the design of the air cooling channel 108 shown in FIG. 2. The cool air forced past the cooling fins 141 may be driven by the airflow past the aircraft, a forward propeller 109 or a rearward ducted fan 150. As displayed in FIG. 7, the full length of the hot side heat exchanger 142 lies within the thermal battery core, while the full span of the regenerator 143 extends across the gap between the thermal battery core and the outer vacuum vessel wall, and the cold side heat exchanger 144 lies within the range of the cooling fins 141. This arrangement maximizes the thermal contact to both the hot and cold thermal reservoirs, and produces a nearly linear temperature gradient across the regenerator.

Stirling Engine Power Modulation

The power produced by the Stirling engine tends to increase with the mean pressure in the expansion space 151 inside the engine. Thus, venting the engine crankcase, through the crankcase pressure relief valve 149 shown in FIG. 7, to the ambient air, for example, serves to decrease the output power. Correspondingly, increasing the crankcase pressure serves to increase the output power.

Pressurization of the crankcase above the ambient atmospheric pressure is preferably achieved by the action of a crankshaft pump 145 that produces a pumping action as the crankshaft rotates, to self-pressurize the crankcase. The crankshaft pump 145 comprises at least one helical groove on either the crankshaft surface or a journal surrounding the crankshaft. It is appreciated that one or more helical grooves may be utilized in the same direction for greater pumping performance. And a filter 146 prevents particulate contamination in the working fluid from clogging the passageways in the crankshaft pump 145.

In the preferred embodiment, the crankcase pressurizes to a value determined by the pressure drop across the crankshaft pump and the outside atmospheric pressure, for the case that the working fluid is simply ambient air. This pressure drop is in turn determined by the design of the grooves, both in terms of the number of grooves, and the groove shape. The steady state speed of the crankshaft pump is designed to produce a given mean operating pressure inside the crankcase of the engine. A pressure drop of one atmosphere across the crankcase pump, for example, produces an operating pressure that is relatively insensitive to the operating altitude of the aircraft. At an altitude corresponding to 10% of atmospheric pressure, the engine operating pressure would be approximately 50% that corresponding to sea level.

An alternative embodiment is shown in FIG. 20 using helium as the working fluid in the Stirling engine, includes a closed and sealed reservoir 160 (the working fluid pressure vessel) serving to contain helium that is vented from the crankcase pressure relief valve 149, and return the released helium to the crankshaft pump 145 in a closed cycle through a filter 146. The pressure of the helium in the sealed chamber is much less than the engine operating pressure, and thus the outer crankshaft journal bearing 162 may readily act as a gas tight seal to prevent significant loss of helium to the ambient air. In another embodiment, the working fluid may be hydrogen, and in addition, a hydrogen permeable cap 163 (even high temperature steel will be adequate to this end under many circumstances) may be used on the hot end of the Stirling engine. In this case, the slow loss of hydrogen from the thermal battery core 136 may be balanced by a slow gain from the Stirling engine hydrogen working fluid through the end cap 163, thereby extending the hydrogen containment lifetime of the thermal battery to an arbitrary degree.

Alternative Configurations

And FIGS. 14, 15, and 18 show alternative arrangements of the solar thermal power plants for aircraft of various configurations. FIG. 14 illustrates the aircraft 100 having two solar power plants, one on each wing 102 of the aircraft. In particular, FIG. 14 shows multiple wing-mounted solar energy collection and storage systems directly coupled to a corresponding wing-mounted heat engine. Thus each solar power plant of each wing is self-sustainable and independently operable. FIG. 15 shows a fuselage-mounted solar energy collection and storage system with a multiplicity of wing mounted propellers driven by a transmission system 107. It is appreciated that the propellers may be arranged to push the aircraft, as specifically shown in FIG. 15, or alternatively to pull the aircraft (not shown). And FIG. 18 shows a fuselage-mounted solar energy collection and storage system with a stern mounted ducted fan propulsion system 150. As shown, the heat engine 140 and cooling fins 141 in particular are cooled via an air inlet 108 that also serves to supply airflow to the ducted fan propulsion system.

Rankine-Brayton Cycle Heat Engine

FIG. 22 illustrates a Rankine-Brayton hybrid thermodynamic cycle heat engine that serves as a second preferred embodiment of the heat engine 140, and is similar in arrangement to that disclosed in U.S. Pat. No. 3,708,979 which operates approximately on a Brayton thermodynamic cycle. As shown in FIG. 22, this embodiment is comprised of a fluidic circuit that includes in sequential flow order: double acting, reciprocating piston, gas phase expander assembly 201, a cooling manifold 202 within a counterflow heat exchanger 203, a gas-phase to liquid-phase, stratospheric air-cooled condenser 204, double acting, reciprocating piston, liquid phase pump assembly 205, a high-pressure, low temperature working fluid reservoir 206, a warming manifold 207 within heat exchanger 203, and a heating manifold 208 within thermal energy storage vessel 209 containing a mixture of lithium-hydride and lithium. The preferred embodiment further comprises a pressure gauge 211, so that the working fluid pressure may be sensed and controlled. It is notable that the hot side temperature of the lithium-hydride and lithium based thermal energy storage vessel is in the vicinity of about 1000 K, which is modest compared to the combustion temperatures associated with coal fired power plants, but is substantially higher than geothermal power plants.

The preferred embodiment of gas expander assembly 201 is of a form well known in the art of double acting steam engines controlled by poppet valves. The preferred embodiment of liquid pump assembly 205 is also of a form well known in the art of fluid pumps. The complete engine fluid circuit may preferably be hermetically sealed, by means described by U.S. Pat. No. 3,708,979, for example, or for convenience merely tightly sealed, with provision for occasional replenishment of leaking working fluid by other means known in the art. It is notable that although a reciprocating pump and expander are shown in the preferred embodiment, it is appreciated that almost any type of liquid pump would be acceptable for pressurization of the liquid phase, including rotary pumps, such as scroll pumps, centrifugal pumps, or internal gear pumps. In addition, many alternatives to the expander are also acceptable, including turbines, screw expanders, lysholm expanders or scroll expanders for example. And although heating channel 208 is illustrated as penetrating through the middle of the heating reservoir of lithium-hydride and lithium, it is appreciated that the heating channel may instead be wrapped around the outside of the thermal energy storage vessel itself, but still remain within the thermal insulation.

A schematic circuit diagram illustrating the connection of generic components of the Rankine-Brayton engine used in the solar thermal aircraft of the present invention is shown in FIG. 24.

Operation of Rankine-Brayton Cycle Heat Engine

In normal operation, as the working fluid flows through the engine, it experiences various changes of state representative of the Rankine-Brayton hybrid thermodynamic cycle. The normal fluid flow vectors are indicated by arrows 301-306 in FIG. 22 at several locations along the circuit, and the associated phase conditions are described here. Starting from the lowest temperature and lowest pressure condition, sub-critical liquid phase working fluid 301 collects below the outlet of condenser 204 in a pool above the inlet to pump 205. The top level of this pool is indicated by dashed line 212. After emerging from pump 205, supercritical pressure liquid phase working fluid 302 passes to storage reservoir 206. In contrast to the subcritical fluid, there is no distinct transition between liquid and gas phases, and there isn't an equivalent to the liquid level 212 present on the high pressure side of the pump. Pump 205 is activated as necessary by controller 220 to maintain the pressure of the emerging working fluid 302, as measured by pressure gauge 211, near its design value, well above its critical pressure. Controller 220 causes crankshaft 222 to spin faster or slower as needed to effect this pressure stabilization. From storage reservoir 206, the working fluid passes through warming manifold 207 of heat interchanger 203. After emerging from warming manifold 207, working fluid 303 has been raised in temperature with minimal drop in pressure, and next enters heating manifold 208. At the outlet of the heating manifold, working fluid 304 has been raised to its hottest point, and is near the temperature of the lithium-hydride+ lithium mixture. After emerging from expander 201, working fluid 305 is reduced in pressure and temperature, and next enters the cooling manifold 202 within the heat interchanger. After emerging from the cooling manifold 202, working fluid 306 is reduced in temperature, but only slightly reduced in pressure. Working fluid 306 enters condenser 204 somewhat above its equilibrium boiling point, is cooled to its boiling point, then condensed to liquid and finally drips from the outlet of the condenser as liquid. Reference characters 301-306 are similarly used in FIG. 24 to indicate the associated thermodynamic states of the working fluid as it passes through the schematic circuit of generic components.

In FIG. 23, an exemplary Rankine-Brayton thermodynamic cycle is shown in terms of the temperature vs. specific entropy around the cycle, illustrating the various phases 301-306 for the specific case of ethene as the exemplary working fluid. Dashed line 310 shows the location of the saturated fluid line in the temperature-entropy plane. The temperature at the peak of curve 310 is exactly equal to the critical temperature. The cycle illustrated in FIG. 23 does not depend on the details of the construction of either the expander or the liquid pump. Rather, all that is needed to determine the cycle is the value of the isentropic efficiency for the expander and pump, and the approach temperature difference of the heat exchangers. The specific choices for these variables are taken to be those listed in Table 2 below. In particular, the maximum working fluid temperature was taken to be 950 K, which is approximately 25 K below the melting point of lithium-hydride, and the pressure of working fluid 304 just before admission to expander 201, was taken to be 200 bar. And the pressure after emerging from expander 201, of working fluid 305 was taken to be 17.7 bar, corresponding to the equilibrium pressure of saturated ethene at 240 K.

Working Fluid of Rankine-Brayton Hybrid Cycle Heat Engine

For application between the temperature bounds characteristic of the lithium-hydride plus lithium mixture at nearly 1000 K on the hot side, and the temperature of the stratosphere at nearly 220 K on the cold side, three exemplary working fluids are ethene, ethane and carbon dioxide, operating from their saturation pressure at the lowest temperature point, up to a maximum pressure limited by the strength of readily available materials, taken here to be about 200 bar. It is notable, however, that the preferred type of working fluid is not limited only to such, as there are many fluids having a critical temperature not far above 220 K.

In Table 2 below, ethane, ethane and $CO_2$ are theoretically compared in the context of application to the high altitude solar thermal aircraft environment of the present invention, with common assumptions for the temperature bounds, the maximum pressure, and the isentropic efficiencies.

TABLE 2

| Parameter | Ethene | Ethane | $CO_2$ |
|---|---|---|---|
| Condensate Temperature(K) | 240 | 240 | 240 |
| Maximum Temperature(K) | 950 | 950 | 950 |
| Saturation Pressure(bar) | 17.7 | 9.7 | 12.8 |
| Maximum Pressure(bar) | 200 | 200 | 200 |
| Expander Isentropic Efficiency | 85% | 85% | 85% |
| Pump Isentropic Efficiency | 70% | 70% | 70% |
| Recuperator ΔT approach (K) | 10 | 10 | 10 |
| Engine Thermal Efficiency | 57% | 57% | 50% |
| Volumetric Expansion Ratio | 9:1 | 17:1 | 11:1 |

It can be seen that both ethene (also known as ethylene) and ethane are equally good in terms of thermal efficiency, and both are somewhat better than carbon dioxide. By virtue of the more modest expansion ratio, the use of ethene is slightly preferred over ethane. By virtue of the less reactive and non-flammable nature of carbon dioxide, for safety reasons it is preferred over ethene and ethene. The volume expansion ratio for any of the three cases, and especially ethene, with a value of approximately 9 from the table above, is in sharp contrast to the case of supercritical steam based Rankine cycle power plants, for which the expansion ratio of the steam is near 10,000 and a large number of expansion stages are required for efficient operation. In the present case, a single stage positive displacement expander, (such as the reciprocating case described above) is feasible. A significant advantage of the reciprocating expander is that very high isentropic efficiency can be attained over a very wide range of operating speeds, as is required to meet the very great range of power demands of a high altitude aircraft in the face of fluctuating local winds.

Power Modulation of Rankine-Brayton Cycle Heat Engine

In the context of the solar aircraft power plant, the preferred means of power adjustment is via adjustment of the speed of operation of the engine. In the face of stronger winds, for which higher propulsive power is required, the crankshaft is allowed to rotate faster, by a governor (not shown). In response to this increased power demand, the rate of flow of working fluid then increases. There is a tendency for the working fluid pressure to drop, but by adaptively increasing the speed of the liquid phase pump to maintain the pressure sensed at gauge 211, the thermodynamic cycle conditions are also maintained substantially constant, and thus the thermal efficiency remains high.

While particular operational sequences, materials, temperatures, parameters, and particular embodiments have been described and or illustrated, such are not intended to be limiting. Modifications and changes may become apparent to those skilled in the art, and it is intended that the invention be limited only by the scope of the appended claims.

I claim:

1. A Rankine-Brayton hybrid thermodynamic cycle heat engine comprising:
   a pump for pressurizing a sub-critical pressure liquid-phase working fluid to a supercritical pressure; heat storage means for storing thermal energy and using the stored thermal energy to heat the supercritical pressure liquid-phase working fluid to a supercritical temperature, supercritical pressure phase; a positive displacement expander for substantially adiabatically expanding the supercritical temperature, supercritical pressure working fluid to reduce the pressure of the working fluid back to a sub-critical pressure level; and a condenser in thermal contact with the ambient environment for condensing the sub-critical pressure working fluid back to the sub-critical temperature liquid phase, whereby thermal energy from said heat storage means is converted to mechanical energy; and
   means for controlling the supercritical pressurization of working fluid produced by the pump, said means for controlling including a pressure gauge for measuring the pressure level of the supercritical pressure working fluid.

2. A Rankine-Brayton hybrid thermodynamic cycle heat engine comprising:
   a pump for pressurizing a sub-critical pressure liquid-phase working fluid to a supercritical pressure; heat storage means for storing thermal energy and using the stored thermal energy to heat the supercritical pressure liquid-phase working fluid to a supercritical temperature, supercritical pressure phase; a positive displacement expander for substantially adiabatically expanding the supercritical temperature, supercritical pressure working fluid to reduce the pressure of the working fluid back to a sub-critical pressure level; and a condenser in thermal contact with the ambient environment for condensing the sub-critical pressure working fluid back to the sub-critical temperature liquid phase, whereby thermal energy from said heat storage means is converted to mechanical energy,
   wherein said heat storage means comprises a thermal container and a mixture of lithium hydride and lithium metal contained therein.

3. The engine of claim 2,
   wherein said mixture of lithium hydride and lithium metal is in substantial equilibrium with dissociation products, including hydrogen gas, and liquid phase lithium and lithium hydride.

4. The engine of claim 2,
   wherein said thermal container includes an inner containment shell structure and an outer vacuum shell supporting an evacuated space therebetween.

5. The engine of claim 4,
   wherein said thermal container includes thermal battery insulation in said evacuated space comprising multiple layers of highly reflective material to shield against radiation.

* * * * *